(12) United States Patent
Teng

(10) Patent No.: US 6,863,395 B1
(45) Date of Patent: Mar. 8, 2005

(54) EYEGLASSES HAVING DETACHABLE LENSES

(75) Inventor: Wei-Che Teng, Wan Lee Tainan (TW)

(73) Assignee: Irene Corporation, Tainan (TW)

( * ) Notice: Subject to any disclaimer, the term of this patent is extended or adjusted under 35 U.S.C. 154(b) by 0 days.

(21) Appl. No.: 10/747,388

(22) Filed: Dec. 29, 2003

(51) Int. Cl.⁷ .................................................. G02C 1/04
(52) U.S. Cl. ........................ 351/103; 351/44; 351/106; 351/121
(58) Field of Search .............................. 351/41, 44, 83, 351/86, 103–109, 111, 116, 119, 121

(56) References Cited

U.S. PATENT DOCUMENTS

| | | | | |
|---|---|---|---|---|
| 6,007,199 A | * | 12/1999 | Yang | 351/86 |
| 6,086,199 A | | 7/2000 | Holland et al. | 351/86 |
| 6,193,367 B1 | * | 2/2001 | Lee | 351/86 |
| 6,550,912 B2 | | 4/2003 | Vitaloni | 352/47 |
| 6,712,465 B1 | | 3/2004 | Teng | 351/47 |

* cited by examiner

Primary Examiner—Huy Mai
(74) Attorney, Agent, or Firm—Alan D. Kamrath; Nikolai & Mersereau, P.A.

(57) ABSTRACT

Eyeglasses includes a frame including right and left portions each including a recess abutted on a bridge, a projection on an endpiece, and an aperture proximate the projection. The eyeglasses further includes two lenses each including an indentation at an outer end and a hole proximate the indentation, two temples, and two connecting mechanisms pivotably coupled to both the temples and the frame. Each connecting mechanism including includes a pin projected from an inner side. The hole is aligned with the aperture. The indentation is engaged with the projection. An inner end of the lens is rested on the recess. The pin is inserted into the hole and the aperture for fastening each lens onto the frame. The original lenses can be easily changed with other lenses having a different color and/or shape by replacement as long as such lenses have the same specifications as the original lenses.

3 Claims, 3 Drawing Sheets

US 6,863,395 B1

EYEGLASSES HAVING DETACHABLE LENSES

BACKGROUND OF THE INVENTION

1. Field of the Invention

The present invention relates to eyeglasses and more particularly to a pair of eyeglasses (e.g., sunglasses) having detachable lenses (e.g., tinted lenses) so as to enable a wearer to change lenses by replacement if such is desired.

2. Description of Related Art

Eyeglasses (e.g., sunglasses) are well known. It is often that a wearer may want to wear another pair of sunglasses having a different color and/or shape for aesthetic purposes or the like. Conventionally, a person has to buy the desired one since lenses and eyeglass frames are sold as a whole. Inevitably, it can bear a financial burden on the buyer. Also, for many people finding a place to store many different sunglasses is not an easy thing. Thus, the present invention seeks to provide a pair of eyeglasses (e.g., sunglasses) having detachable lenses (e.g., tinted lenses) so as to enable a wearer to change the original lenses with another pair of lenses having a different color and/or shape by replacement if such is desired. For example, U.S. Pat. No. 6,712,465 discloses a pair of eyeglasses comprising a frame having two bifurcated end pieces pivotally connected to lens frames, with the outer end of each lens frame having a rear tab releasably fastened in a corresponding cavity of the frame by snapping. Thus, a person may change the lens frames as desired.

SUMMARY OF THE INVENTION

It is an object of the present invention to provide a pair of eyeglasses comprising a frame including a central bridge, a right portion, and a left portion wherein each portion includes a recess abutted on the bridge, a projection on an endpiece, and an aperture proximate the projection; two lenses each including an indentation at an outer end and a through hole proximate the indentation; two temples; and two connecting mechanisms pivotally coupled to both the temples and the frame. Each connecting mechanism includes a cylindrical pin projected from an inner side, wherein the through hole is aligned with the aperture, the indentation is matingly engaged with the projection, an inner end of the lens is rested on the recess, and the pin is inserted into the through hole and the aperture for fastening each lens onto the frame. By utilizing the present invention, a wearer can easily change the original lenses with another pair of lenses having a different color and/or shape by replacement if such is desired and as long as such lenses have the same specifications as the lenses of the present invention.

The above and other objects, features and advantages of the present invention will become apparent from the following detailed description taken with the accompanying drawings.

BRIEF DESCRIPTION OF THE DRAWINGS

FIGS. 2(A) and 2(B) are enlarged, fragmentary views of the two endpieces of the eyeglasses;

DETAILED DESCRIPTION OF THE PREFERRED EMBODIMENTS

Figure 1:
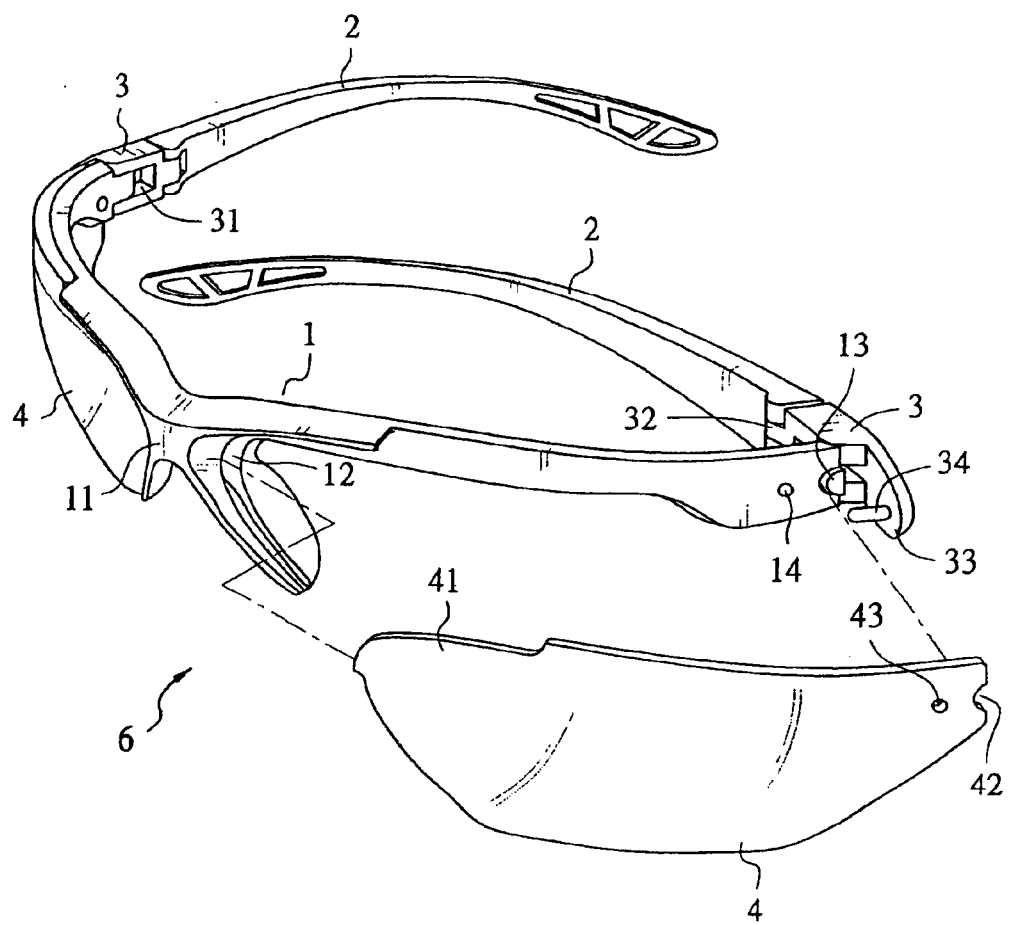
FIG. 1 is an exploded, perspective view of a preferred embodiment of eyeglasses according to the invention.
Figure 2:
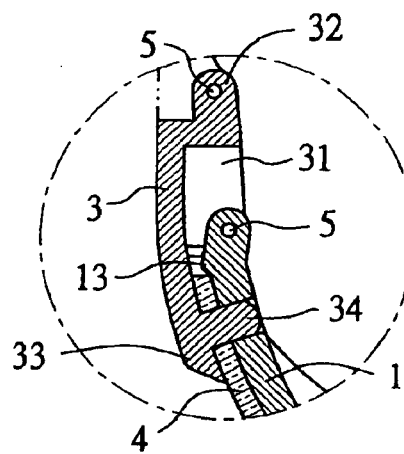
FIG. 2 is a top plan view of the assembled eyeglasses.
Figure 2:
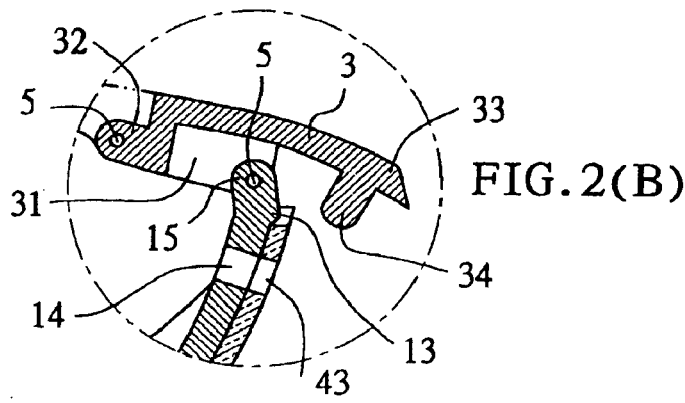
Figure 2:
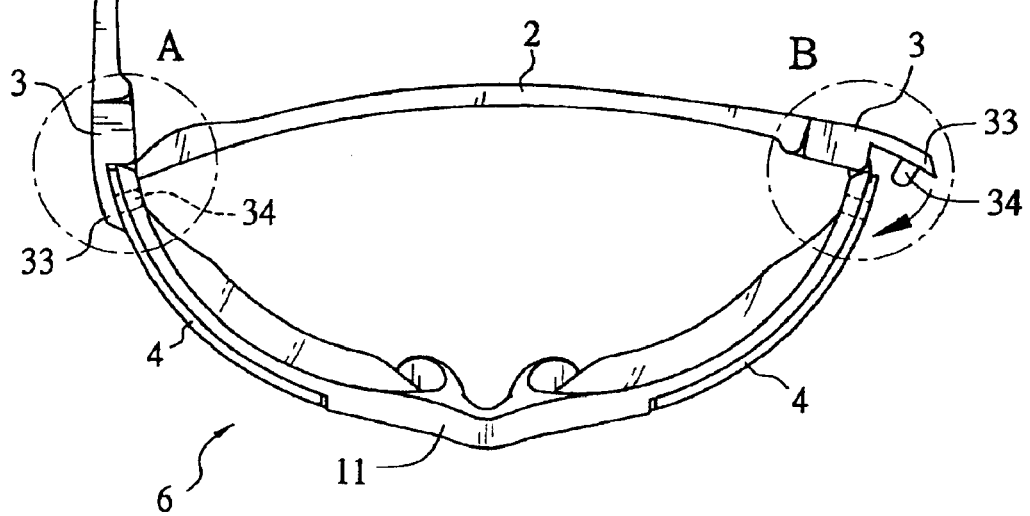
Figure 3:
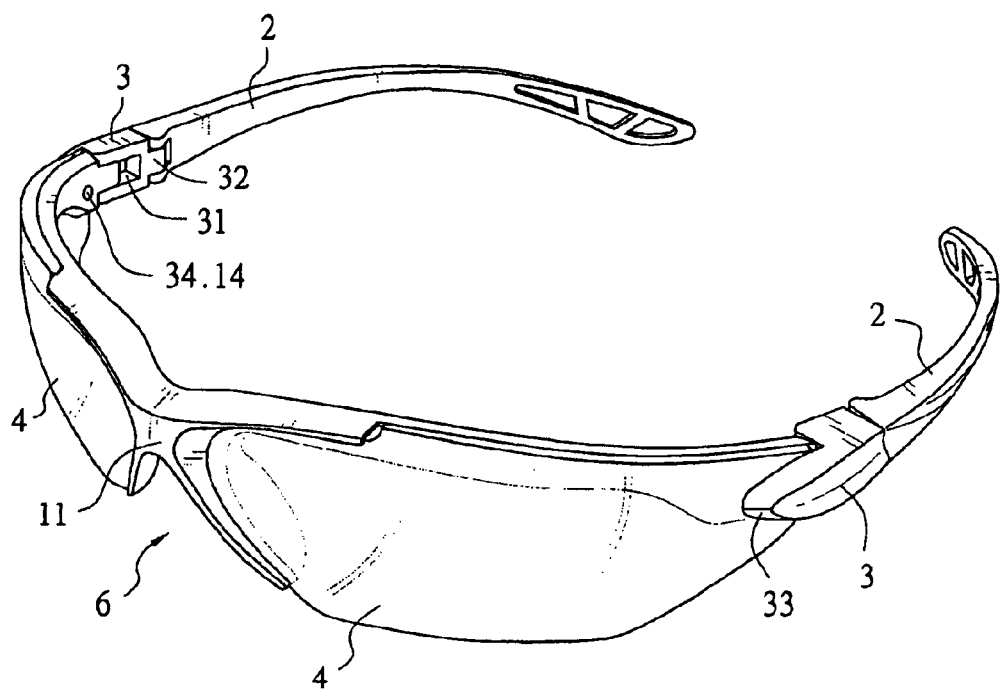
FIG. 3 is a perspective view of the eyeglasses in a state ready to be worn on a wearer.
Figure 4:
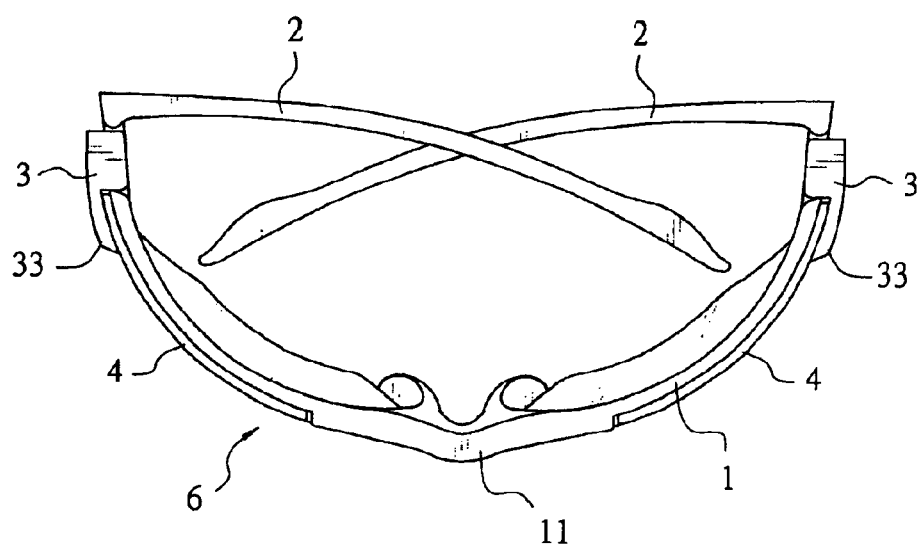
FIG. 4 is a top plan view of the eyeglasses in a storage state with both temples being folded.

Referring to FIGS. 1 to 4, a pair of eyeglasses (e.g., sunglasses) 6 constructed in accordance with the invention is shown. The eyeglasses 6 comprises a frame 1 including a central bridge 11 having left and right portions each including a recess 12 abutted on the bridge 11, a projection 13 on an endpiece, the projection 13 having an arcuate side facing the bridge 11, a protuberance 15 extended outwardly from the endpiece, the protuberance 15 having a vertical aperture (not shown), and an aperture 14 proximate the projection 13. Eyeglasses 6 further includes two lenses 4 each including an indentation 42 at an outer end and a through hole 43 proximate the indentation 42 wherein the through hole 43 is aligned with the aperture 14. The indentation 42 is matingly engaged with the projection 13. An inner end 41 of the lens 4 is rested on the recess 12 when the lenses 4 are mounted in the frame 1 by snapping. Eyeglasses 6 further includes two temples 2 each having an aperture (not shown) and a groove (not numbered) both at one end proximate the endpiece of the frame 1. Eyeglasses 6 further includes two connecting mechanisms 3 each including a protrusion 32 having a vertical aperture (not shown), the protrusion 32 being fitted in the groove of the temple 2 with the vertical aperture thereof being aligned with the aperture of the temple 2 so that a fastener (e.g., screw) 5 can be driven therethrough to pivotably secure both the temple 2 and the connecting mechanism 3 together. A cavity 31, having two vertical apertures (not shown) at opposite end members thereof, is adapted to snugly receive the protuberance 15 with adjacent apertures thereof being aligned with the aperture of the protuberance 15 so that a fastener (e.g., screw) 5 can be driven therethrough to pivotably secure both the frame 1 and the connecting mechanism 3 together. An end structure 33 includes a pin 34 projected from an inner side of the end structure 33 wherein a wearer may press the end structure 33 to insert the pin 34 into the through hole 43 and the aperture 14 for fastening the lens 4 onto the frame 1.

Note that a length of the pin 34 is about the thickness of the lens 4 plus the depth of the aperture 14. Also, a diameter of the pin 34 is about the same as that of each of the through hole 43 and the aperture 14. By configuring as above, the fastening of the lenses 4 onto the frame 1 is more reliable.

In view of the above, it is obvious that a wearer can easily change the original lenses with another pair of lenses having a different color and/or shape by replacement if such is desired and as long as such lenses have the same specifications as the lenses of the present invention. Moreover, it is easy to find a place to store the eyeglasses since its size is much reduced by folding the temples (see FIG. 4).

While the invention herein disclosed has been described by means of specific embodiments, numerous modifications and variations could be made thereto by those skilled in the art without departing from the scope and spirit of the invention set forth in the claims.

What is claimed is:

1. A pair of eyeglasses, comprising:

a frame including a central bridge, a right portion, and a left portion wherein each portion includes a recess abutted on the bridge, a projection on an endpiece, and an aperture proximate the projection;

two lenses each including an indentation at an outer end and a through hole proximate the indentation;

two temples; and two connecting mechanisms pivotably coupled to both the temples and the frame, each connecting mechanism including a cylindrical pin projected from an inner side;

wherein the through hole is aligned with the aperture, the indentation is matingly engaged with the projection, an inner end of the lens is rested on the recess, and the pin is inserted into the through hole and the aperture for fastening each lens onto the frame.

2. The eyeglasses of claim 1, wherein the eyeglasses are sunglasses.

3. The eyeglasses of claim 1, wherein a length of the pin is about a thickness of the lens plus a depth of the aperture, and a diameter of the pin is about equal to that of each of the through hole and the aperture.

* * * * *